US010483793B2

(12) United States Patent
Wilson et al.

(10) Patent No.: US 10,483,793 B2
(45) Date of Patent: Nov. 19, 2019

(54) EMERGENCY SUPPLY UNIT

(71) Applicant: TRIDONIC GMBH & CO KG, Dornbirn (AT)

(72) Inventors: Ian Wilson, Sunderland (GB); Cristiano De Menezes, Durham (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 204 days.

(21) Appl. No.: 15/551,371

(22) PCT Filed: Feb. 23, 2016

(86) PCT No.: PCT/AT2016/050038
§ 371 (c)(1),
(2) Date: Aug. 16, 2017

(87) PCT Pub. No.: WO2016/134395
PCT Pub. Date: Sep. 1, 2016

(65) Prior Publication Data
US 2018/0019615 A1     Jan. 18, 2018

(30) Foreign Application Priority Data
Feb. 24, 2015   (GB) .................................. 1503684.1

(51) Int. Cl.
*H02J 9/06*      (2006.01)
*G05B 19/042*   (2006.01)
(Continued)

(52) U.S. Cl.
CPC ............ *H02J 9/061* (2013.01); *G05B 19/042* (2013.01); *H02J 7/0057* (2013.01); *H02J 7/0065* (2013.01);
(Continued)

(58) Field of Classification Search
CPC ........ H02J 9/061; H02J 7/0065; H02J 7/0057; H02J 9/005; H02J 2007/0059; H02J 7/022;
(Continued)

(56) References Cited

U.S. PATENT DOCUMENTS 4,516,665 A * 5/1985 Watanabe ................. B66B 5/02
                                                              187/296
5,892,298 A * 4/1999 Levasseur ............... E05B 47/00
                                                              200/50.01
(Continued)

FOREIGN PATENT DOCUMENTS

WO     2011124723     10/2011

OTHER PUBLICATIONS

UK Search Report in priority application GB1503684.1 dated Sep. 11, 2015.
(Continued)

*Primary Examiner* — Jared Fureman
*Assistant Examiner* — Michael J Warmflash
(74) *Attorney, Agent, or Firm* — Andrus Intellectual Property Law

(57) ABSTRACT

An emergency operating arrangement for at least one building technical device is provided, comprising a power supply unit, and an emergency supply unit, the power supply unit and the emergency supply unit being adapted to be supplied by an electrical supply and being configured to output a DC voltage, wherein the emergency supply unit is configured to detect an emergency situation and being configured to output a DC voltage higher than the DC voltage output by the power supply unit when the emergency situation is detected.

16 Claims, 7 Drawing Sheets

(51) Int. Cl.
*H02J 7/00* (2006.01)
*H02J 9/00* (2006.01)
H02J 7/02 (2016.01)

(52) U.S. Cl.
CPC ...... *H02J 9/005* (2013.01); *G05B 2219/2639* (2013.01); *H02J 7/022* (2013.01); *H02J 9/065* (2013.01); *H02J 2007/0059* (2013.01)

(58) Field of Classification Search
CPC .................. H02J 9/065; G05B 19/042; G05B 2219/2639
See application file for complete search history.

(56) References Cited

U.S. PATENT DOCUMENTS

| | | | | |
|---|---|---|---|---|
| 8,823,272 B2* | 9/2014 | Trainor | ................... | H02J 9/065 |
| | | | | 315/200 R |
| 9,270,143 B1* | 2/2016 | Mangiaracina | ......... | H02J 9/062 |
| 2010/0265628 A1* | 10/2010 | Blinder | ................... | H02J 1/108 |
| | | | | 361/160 |
| 2013/0147269 A1 | 6/2013 | Zimmermann et al. | | |
| 2015/0048685 A1* | 2/2015 | Wilson | ................... | H02J 9/062 |
| | | | | 307/66 |

OTHER PUBLICATIONS

International Search Report and Written Opinion in parent PCT Application PCT/AT2016/050038 dated Aug. 12, 2016.

* cited by examiner

EMERGENCY SUPPLY UNIT

CROSS REFERENCE TO RELATED APPLICATION

The present application is the U.S. national stage application of International Application PCT/AT2016/050038, filed Feb. 23, 2016, which international application was published on Sep. 1, 2016 as International Publication WO 2016/134395 A1. The International Application claims priority to Great Britain Patent Application 1503684.1, filed Feb. 24, 2015.

FIELD OF THE INVENTION

The invention relates to an emergency supply unit that supplies devices connected thereto with power and in particular with a DC voltage in case an emergency is detected. The connected devices are building technical devices.

BACKGROUND OF THE INVENTION

The emergency supply unit can be part of an operating arrangement, in which the emergency supply unit is linked to and/or monitors a voltage output by a power supply unit. Therefore, the emergency supply unit can be arranged in close proximity to or even in a common enclosure with the power supply unit, but can also be spatially separated from the power supply unit.

Building technical devices can be connected to the emergency supply unit and/or the power supply unit. Typically a group of devices is supplied from the power supply unit in a non-emergency mode of operation, while other devices are supplied from the emergency supply unit in an emergency mode of operation. However, the emergency supply unit can also supply the devices supplied from the power supply unit in the non-emergency case.

The building technical devices connected to the emergency supply unit and/or the power supply unit, in the following also referred to as connected devices, can be actuators and/or sensors used in a building, such as electrical drives for opening or shutting doors or windows, for controlling ventilation or for sensing smoke, heat, or humidity. While generally a large variety of building technical devices can be supplied and driven by the emergency supply unit or the operating arrangement according to the invention, the following focuses on lighting means or luminaries comprising lighting means, especially lighting means comprising LEDs. The lighting means also can especially be LEDs.

While emergency supply units and also modular arrangements are known in the art, e.g. from WO 2011/124723 A1, the invention improves reliability of the detection of an emergency state but also on maintaining operation of the connected devices, especially the connected lighting means.

SUMMARY OF THE INVENTION

The invention hence provides an operating arrangement, an emergency supply unit, a method for operating at least one luminary and a system of luminaries and an operating arrangement as described.

In a first aspect, an emergency operating arrangement for at least one building technical device is provided, comprising a power supply unit, and an emergency supply unit, the power supply unit and the emergency supply unit being adapted to be supplied by an electrical supply and being configured to output a DC voltage, wherein the emergency supply unit is configured to detect an emergency situation and being configured to output a DC voltage higher than the DC voltage output by the power supply unit when the emergency situation is detected.

The emergency supply unit can comprise a detection circuit configured to detect a change in the electrical supply as indication of the emergency situation. The emergency supply unit can output the higher DC voltage when a change in the electrical supply is detected by the detection circuit.

The emergency supply unit can comprise a charging circuit, preferably a flyback converter, and an energy storage component, the charging circuit being configured to charge the energy storage component.

The charging unit may be supplied from the electrical supply.

The emergency supply unit comprises an output converter, preferably a boost converter, supplied from the energy storage component, the output converter being configured to output the higher DC voltage.

The detection circuit can be configured to output an indication signal indicating a state of the electrical supply, in particular indicating whether the electrical supply is an AC voltage, a DC voltage, or no voltage.

The emergency supply unit can comprise a control unit to evaluate the indication signal output by the detection circuit and being configured to control operation of at least one of the charging circuit, the output converter and a switching element.

The emergency supply unit comprises the switching element, in particular a transistor, preferably a transistor which is buffered via relay contacts. The switching element may be configured to switch between the output of the output converter and the output of the power supply unit.

The emergency operating arrangement can comprise a power line communication interface to preferably receive configuration information. The control unit may evaluate the configuration information and to adapt operating parameters of the emergency operating arrangement and in particular of emergency supply unit.

The detection circuit can be configured to detect a failure of an AC voltage or a change from an AC voltage to a DC voltage or a switch on of a DC voltage.

In another aspect an emergency supply unit is provided adapted to be supplied from an electrical supply and being configured to output a DC voltage, comprising a detection circuit being configured to detect a change in the electrical supply, and wherein the emergency supply unit, when a change in the electrical supply is detected, outputs a DC voltage higher than the DC voltage output when no change in the electrical supply is detected.

In a further aspect, building technical device is provided, comprising at least one input terminal, and an emergency converter configured to detect DC voltage supplied at the at least one input terminal, to operate the building technical device in an emergency operating mode, in particular to dim a lighting means, when the detected DC voltage increases above a threshold value.

In yet another aspect, a system of at least one building technical device as previously described and a emergency operating arrangement or the emergency supply unit as previously described is provided, the at least one input terminal of the at least one building technical device being connected to the emergency operating arrangement and/or the emergency supply unit. The at least one input terminal typically is a supply terminal.

The at least one terminal of the at least building technical device can be connected to emergency operating arrangement and/or the emergency supply unit by separate supply channels.

In still another aspect, a method for operating at least one building technical device is provided, wherein a power supply unit and an emergency supply unit are supplied by an electrical supply and output a DC voltage, wherein the emergency supply unit detects an emergency situation and outputs a DC voltage higher than the DC voltage output by the power supply unit when the emergency situation is detected.

In yet a further aspect, an emergency operating arrangement for building technical devices, comprising a power supply unit, and an emergency supply unit, the power supply unit and the emergency supply unit being adapted to be supplied by an electrical supply and being configured to output a DC voltage, wherein the emergency supply unit comprises a detection circuit configured to detect a change in the electrical supply and the DC voltage output by the power supply, and wherein the emergency supply unit is configured to output a DC voltage corresponding to the DC voltage output by the power supply unit when a change in the DC voltage output by the a power supply unit is detected.

The emergency supply unit can be configured to output the DC voltage corresponding to the DC voltage output by the power supply unit as when no change is detected in the electrical supply.

The change of the DC voltage can be a failure or a voltage drop of the DC voltage output by the power supply unit.

The charging unit can be supplied from the electrical supply, and in particular an AC voltage.

The emergency supply unit can comprise an output converter, preferably a boost converter, supplied from the energy storage component, the output converter being configured to output the DC voltage.

The detection circuit can be configured to output an indication signal indicating a state of the DC output by the power supply, in particular indicating a DC voltage or no voltage.

The emergency supply unit may comprise a control unit, wherein the control unit is configured to evaluate the indication signal output by the detection circuit and being configured to control operation of the charging circuit to charge the energy storage component from the electrical supply and the output converter to output the DC voltage corresponding to the DC voltage output by the power supply unit.

The emergency operating arrangement can comprise a power line communication interface configured to preferably receive configuration information, wherein the control unit is configured to evaluate the configuration information and to adapt operating parameters of the emergency operating arrangement and in particular of the emergency supply unit.

In another aspect a method for operating at least one building technical device is provided, wherein a power supply unit and an emergency supply unit are supplied by an electrical supply and output a DC, wherein the emergency supply unit comprises a detection circuit to detect a change in the electrical supply and the DC voltage output by the a power supply unit, and wherein the emergency supply unit outputs a DC voltage corresponding to the DC voltage output by the power supply unit when a change in the DC voltage output by the a power supply unit is detected.

In yet a further aspect, an emergency operating arrangement for building technical devices is provided, comprising a power supply unit, and an emergency supply unit, the power supply unit and the emergency supply unit being adapted to be supplied by an electrical supply and being configured to output a DC voltage, wherein the emergency supply unit comprises a detection circuit configured to detect a change in the electrical supply, and wherein the emergency supply unit is configured to output a DC voltage corresponding to the DC voltage output by the power supply unit when a change in the electrical supply is detected.

The electrical supply can be an AC voltage, particularly a mains voltage, and wherein the change is a quality decrease of the AC voltage, a voltage drop and/or a phase change or failure of the AC voltage.

The emergency supply unit can output the DC voltage corresponding to the DC voltage output by the power supply unit when no change is detected in the electrical supply.

The charging unit can be supplied from a decreased AC voltage.

The emergency supply unit may comprise an output converter, preferably a boost converter, supplied from the energy storage component, the output converter being configured to output the DC voltage.

The detection circuit can output an indication signal indicating a quality of the electrical supply.

The emergency supply unit may comprise a control unit, wherein the control unit is configured to evaluate the indication signal output by the detection circuit and being configured to control operation of the charging circuit to charge the energy storage component from the decreased AC voltage and the output converter to output the DC voltage corresponding to the DC voltage output by the power supply unit.

The emergency operating arrangement can comprise a power line communication interface configured to preferably receive configuration information, wherein the control unit is configured to evaluate the configuration information and to adapt operating parameters of the emergency operating arrangement and in particular of the emergency supply unit.

In still a further aspect a method for operating building technical device is provided, wherein a power supply unit and an emergency supply unit being adapted to be supplied by an electrical supply and being configured to output a DC voltage, wherein the emergency supply unit comprises a detection circuit to detect a change in the electrical supply, and wherein the emergency supply unit outputs a DC voltage corresponding to the DC voltage output by the power supply unit when a change in the electrical supply is detected.

In still a further aspect, which can be used in context with the other aspects mentioned or which can be used independently thereof, a method for operating building technical devices is provided, wherein a power supply unit and an emergency supply unit are adapted to be supplied by an electrical supply and are configured to output a DC voltage, wherein the emergency supply unit comprises a detection circuit to detect a failure of the power supply unit and to detect when there is no change in the electrical supply, and wherein the emergency supply unit outputs a DC voltage corresponding to the DC voltage output by the power supply unit provided during normal operation the power supply unit. Such normal operation means an operation of the power supply unit without failure. The detection circuit monitors the electrical supply and/or the output DC voltage and can indicate normal operation.

BRIEF DESCRIPTION OF THE DRAWINGS

The invention is now also described with reference to the figures.

DETAILED DESCRIPTION

Figure 1:
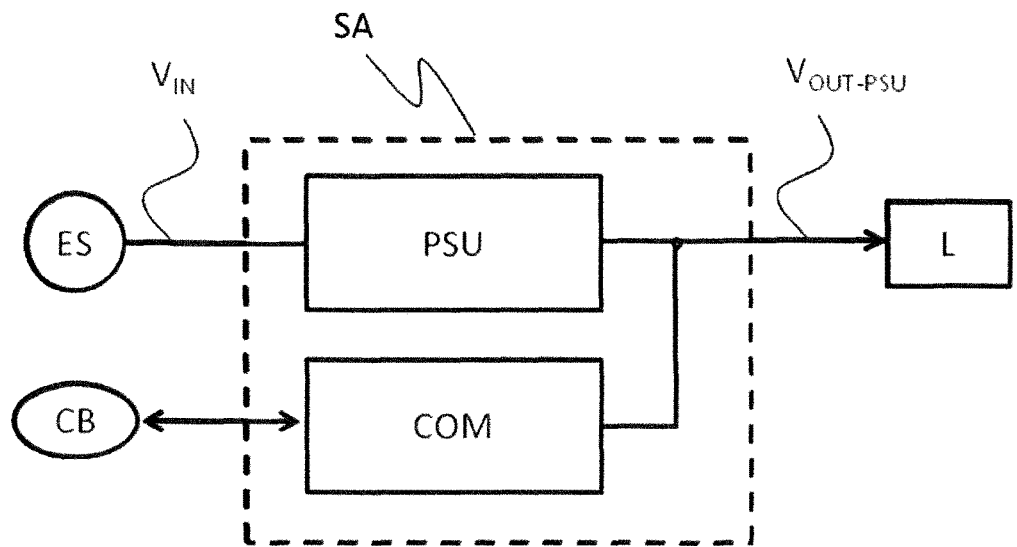
FIG. 1 shows a supply arrangement known from the prior art.

FIG. 1 shows a setup according to a known supply arrangement SA driving connected devices or loads L, such as actuators, motors, sensors, luminaries, lighting means of a building. The supply arrangement SA comprises a power supply unit PSU, which can also be referred to as a "maintained unit" as it can directly drive the connected devices from a supply voltage $V_{IN}$ supplied from electrical supply ES to the power supply unit PSU, which typically is an AC or mains voltage. The power supply unit PS may facilitate an AC voltage to DC voltage conversion and outputs a voltage $V_{OUT-PSU}$ to a number of connected devices L. Preferably the power supply unit PS may facilitate an isolated AC voltage to DC voltage conversion and generate a SELV output. The connected devices L may be formed by lighting means that can be used as a connected device which is later shown in FIG. 9, where a DC/DC converter drives at least one LED or a group of LEDs.

The power supply unit PSU may be accompanied by a communication module COM, which preferably receives commands from a command source CB, which can be a bus such as a DALI or DSI bus. The communication module COM may therefore comprise a command conversion unit which may convert commands of one protocol, for example DALI commands, to commands of another protocol, for example to Power Line Communication (PLC) commands. The converted or translated commands can then be applied to the voltage $V_{OUT-PSU}$ output by the power supply unit PSU.

Therefore, the voltage $V_{OUT-PSU}$ output by the power supply unit PSU may be modulated with a communication signal in order to provide a communication between the supply arrangement SA and/or the command source CB and the connected devices L. The communication module COM may also comprise an internal power supply, such as a low voltage power supply (LVPS), which is used to electrically supply the communication module COM and to provide the energy needed for reception, translation, and the sending of commands. Of course, the system shown in FIG. 1 does not provide any emergency capabilities.

Figure 2:
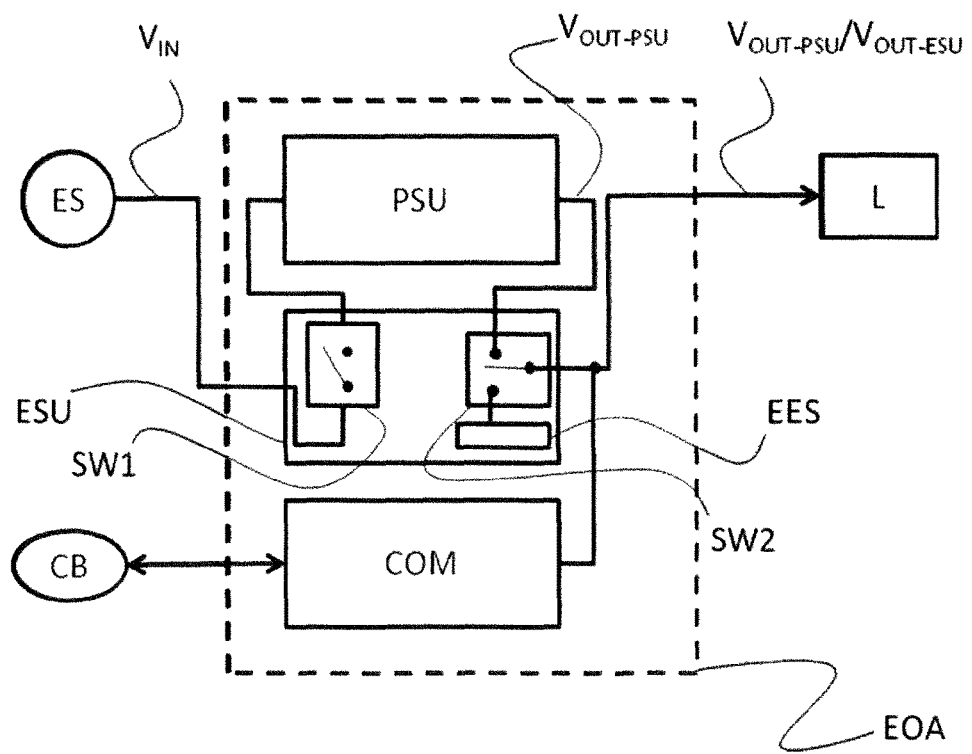
FIG. 2 shows a schematic illustration of an arrangement according to the invention.

Therefore, in FIG. 2 an emergency operating arrangement EOA is shown. The emergency operating arrangement EOA can power the connected devices L in normal operation (or maintained mode), as described for FIG. 1, but also in case of an emergency.

Similar to the supply arrangement SA shown in FIG. 1, the emergency operating arrangement EOA also comprises a power supply unit PSU and may also comprise a communication COM in order to facilitate communication between the command source CB and the connected devices L.

In addition to the power supply unit PSU shown in FIG. 1, the emergency operating arrangement EOA of FIG. 2 additionally shows an emergency supply unit ESU, which is provided to allow a supply of the connected devices L, or specific emergency devices such as emergency lighting means, in case an emergency case is detected.

As can be seen from FIG. 2, the electrical supply ES now supplies the power supply unit PSU and the emergency supply unit ESU, wherein the electrical supply of the power supply unit PSU is provided via the emergency supply unit ESU. The emergency supply unit ESU can now monitor the power supplied from the electrical supply ES to the power supply unit PSU.

The power supply unit PSU outputs the voltage $V_{OUT-PSU}$ to the connected devices L, but not directly. Instead, the voltage $V_{OUT-PSU}$ output by the power supply unit PSU is fed indirectly to the connected devices L by proxy of the emergency supply unit ESU. The communication module COM can, again, modulate the voltage supplied to the connected devices L, by modulating the voltage that, is now output to the connected devices L via the emergency supply unit ESU.

The emergency supply unit ESU also comprises two switching elements SW1, SW2 and an emergency energy source EES. Hence, when monitoring of the voltage $V_{IN}$ supplied from the electrical supply ES meets criteria stored in a memory functionally linked to or comprised in the emergency supply unit ESU (not shown) indicating an emergency state, the emergency supply unit ESU can disconnect the power supply unit PSU from the electrical supply ES by first switching element SW1 (e.g. a transistor, FET or MOSFET, relay, solid state relay) and switches supply of the connected devices from the power supply unit PSU to the emergency energy source EES by second switching element SW2 (e.g. a transistor, FET or MOSFET, relay, solid state relay). Thus, in case of an emergency a DC voltage $V_{OUT-ESU}$ is supplied from the emergency energy source EES to the connected devices L.

According to the invention, it is now the case that the voltage $V_{OUT-ESU}$ supplied from the emergency energy source EES to the connected devices in an emergency case is higher than the voltage $V_{OUT-PSU}$ output by the power supply unit PSU in the maintained mode or non-emergency case. For example, instead of supplying a voltage of 30-50 Volts DC, preferably 48 Volts DC, to the connected devices L, a higher or boosted voltage can be supplied to the connected devices L, e.g. 40-70 Volts DC, preferably 55 Volts DC.

An advantage of the different voltage levels between the non-emergency mode and the emergency mode is that a converter of a connected device L supplied by the emergency voltage can detect the emergency state and adapt its operational parameters.

In addition, as the emergency DC voltage level is set higher than the non-emergency level, the converter can drive the same load in the same operation mode (step-up, step-down mode or type of operation, e.g. continuous conduction mode, discontinuous conduction mode, borderline mode etc.) as in the non-emergency state. Of course, it is also possible that emergency supply unit ESU, depending on the tested criteria of the voltage supplied by the electrical supply ES, can also provide more voltage levels, which can be used to signal specific states. Then, also the converter of the connected device L can be configured to discriminate more than two voltage levels from each other.

Figure 3:
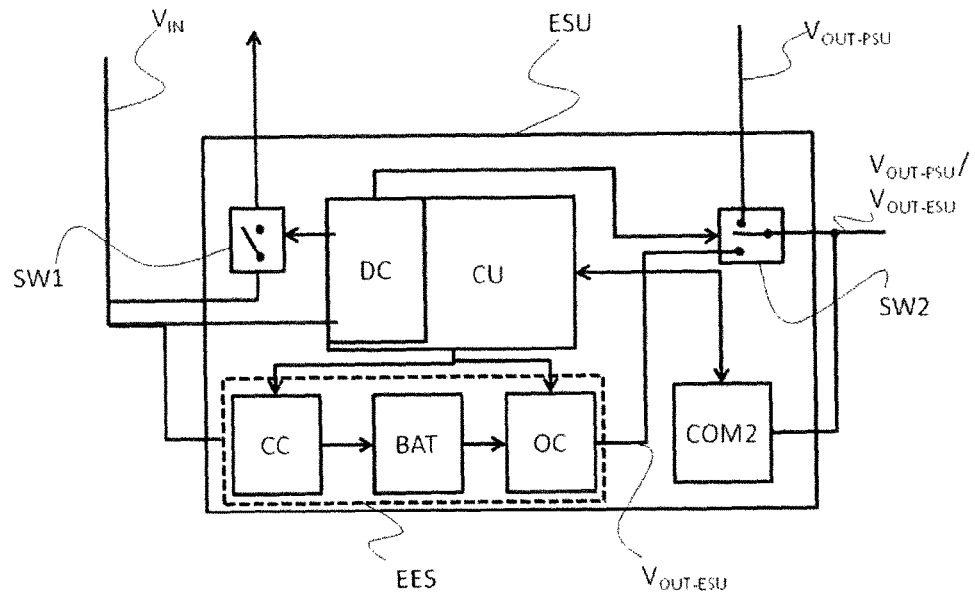
FIG. 3 schematically illustrates an emergency supply unit according to the invention.

The emergency supply unit ESU is now shown in more detail in FIG. 3. As can be seen, the electrical supply voltage $V_{IN}$ is detected by a detection circuit DC, which senses the voltage $V_{IN}$ supplied by the electrical supply. The detection circuit DC may be coupled with a control unit CU or may be part thereof. However, the detection circuit DC can also be separate from the control unit CU.

Also, the emergency energy source EES is shown in more detail. The emergency energy source EES can comprise a charging circuit CC, especially employing a flyback converter, which charges an energy storage component BAT, for example a capacity, an accumulator and/or a battery. The charging circuit CC is also supplied with voltage $V_{IN}$ supplied by the electrical supply ES. The emergency energy source EES also comprises an output converter OC, preferably a boost converter, which is supplied from the energy storage component BAT.

The operation of the charging circuit CC and the output converter OC can be controlled by the control unit CU and/or the detection circuit DC. There may also be additional control elements used.

The emergency supply unit ESU may also comprise a communication module COM2, which typically consists of a PLC modem and a low voltage power supply (e.g. an LVPS). The PLC modem especially is provided for communicating with the control unit CU of the emergency supply unit ESU and may in particular be provided to test signals applied to the output voltage $V_{OUT\text{-}PSU}$ fed to the connected devices L and being modulated on the output voltage $V_{OUT\text{-}PSU}$ by the communication module COM. The communication module COM2 can be powered from the output voltage of the power supply unit PSU, for example with 48 Volts DC, or a DC voltage that is boosted to a higher DC voltage, for example 55 or 60 Volts DC.

In emergency supply unit ESU the second switching element SW2 can be a relay, which during normal operation is switched to relay the output voltage $V_{OUT\text{-}PSU}$ output by the power supply unit PSU to the connected devices L. In case of an emergency situation, however, the second switching element SW2 is switched to the DC voltage output of the output converter OC and therefore isolates the power supply unit PSU from the connected devices. Also, the detection circuit DC is able to deactivate the power supply from the energy supply ES to the power supply unit PSU by the first switching element SW1.

The control unit CU, which may be an ASIC or microcontroller (µC) can monitor the voltage output by the output converter OC, but also may control the charging circuit CC charging the energy storage BAT and may also detect an excess discharge or fault in the charging or output operation.

An emergency situation preferably is detected by the detection circuit DC when a change in the voltage $V_{IN}$ from electrical supply ES is detected. For example, in an non-emergency case, an AC supply voltage can be supplied to the emergency operating arrangement EOA. The supplied AC voltage may either change in its characteristics (e.g. a phase of the AC voltage can fail), may change to a DC supply voltage or may fail entirely. Also the voltage can drop and only a fraction of the normally supplied voltage $V_{IN}$ may supplied to the emergency operating arrangement EOA and hence to the power supply unit PSU.

In particular, the detection circuit DC may detect the change in the electrical supply $V_{IN}$, e.g. from AC voltage to DC voltage or a switch on of a DC voltage and may output or issue an indication signal that can be transferred and received by the control unit CU to indicate a state or state change of the electrical supply voltage $V_{IN}$.

As an example, the emergency supply unit ESU may comprise two supply connections for connection the electrical mains supply ES'. A first supply connection may be used as permanent line input whereby the emergency supply unit ESU may be connected directly to electrical mains supply ES'. The second supply connection may be used as so called switched life connection where the second supply connection may be connected via a mains switch to the electrical mains supply ES'. This second supply connection may be used to detect whether the lighting system shall be switched off by a user, e.g. in case when a room is left empty. The first supply connection may be used for detection whether the electrical mains supply ES' and an emergency situation is present. The detection circuit DC may monitor the voltage on the first supply connection and detect the change in the electrical supply $V_{IN}$, e.g. from AC voltage to DC voltage or from no voltage to DC voltage (meaning a switch on of a DC voltage), and may output or issue an indication signal that can be transferred and received by the control unit CU to indicate a state or state change of the electrical supply voltage $V_{IN}$.

The control unit CU can evaluate the indication signal that is output by the detection circuit DC and can then, based on a configuration scheme stored in a memory unit (not shown) of the emergency supply unit ESU, control the charging circuit CC and the output converter OC and also the first and second switching elements SW1, SW2 in order to connected devices form the emergency supply unit ESU instead of the power supply unit PSU. As stated above, the voltage output by the emergency supply unit ESU in case of an emergency situation is higher than the voltage typically supplied by the power supply unit PSU.

The communication module COM2 of the emergency supply unit ESU can also be used to receive configuration information for the emergency supply unit ESU and/or the emergency operating arrangement EOA. The control unit CU can use these information to adapt operating parameters of the emergency supply unit ESU, the emergency energy source EES and/or in particular may change operation of the charging circuit CC and/or the output converter OC. Especially, control unit CU may control the charging circuit CC and/or the output converter OC to change the charging scheme of the energy storage component BAT and/or to increase the voltage $V_{OUT\text{-}ESU}$ output by the emergency supply unit ESU. Also, based on information received by the communication module COM2 the control unit CU may change the operating scheme stored in the memory unit to be followed when an emergency situation is detected. The communication module COM2 can be used to schedule or activate test events e.g. battery tests as well as for information transfer, e.g. for download and transfer of test results.

A connected device L (at least one lighting means, luminary, LED, . . . ) supplied from the power supply unit PSU and/or the emergency supply unit ESU of the emergency operating arrangement EOA at least comprises one supply terminal at which the output voltage $V_{OUT\text{-}PSU}$ or $V_{OUT\text{-}ESU}$ can be received. Also, the connected device L may comprise a converter, e.g. a DC/DC-converter, or control circuit that monitors the voltage supplied at the at least one terminal and which operates the connected device or parts thereof (e.g. lighting means of a luminary) depending on the detected voltage. In particular, in case of a lighting means or luminary, the brightness of the emitted light can be dimmed, when a voltage increase is detected and especially when the voltage increases above a threshold value. In particular, the converter or the control circuit of the connected device L may operate the respective device at a specific percentage of the typical power of a non-emergency case.

In short, the emergency operating arrangement EOA or emergency supply unit ESU detects a failure in the supply received and increases the electrical voltage output to a higher voltage than the voltage that is supplied to the connected devices L in a non-emergency operation.

The voltage output to the connected devices L includes a safety margin which accounts for any losses (for example cable losses, fluctuations, etc.) which may affect the voltage supplied to the connected devices. Therefore, the higher voltage is chosen to be significantly higher than the voltage supplied in a non-emergency case. The voltage level supplied in an emergency case might be adjusted to suit the capacity of the battery and the required duration. Some of the connected devices L may be configured for non-emergency operation only and may switch off when the higher supply voltage is detected.

Figure 4:
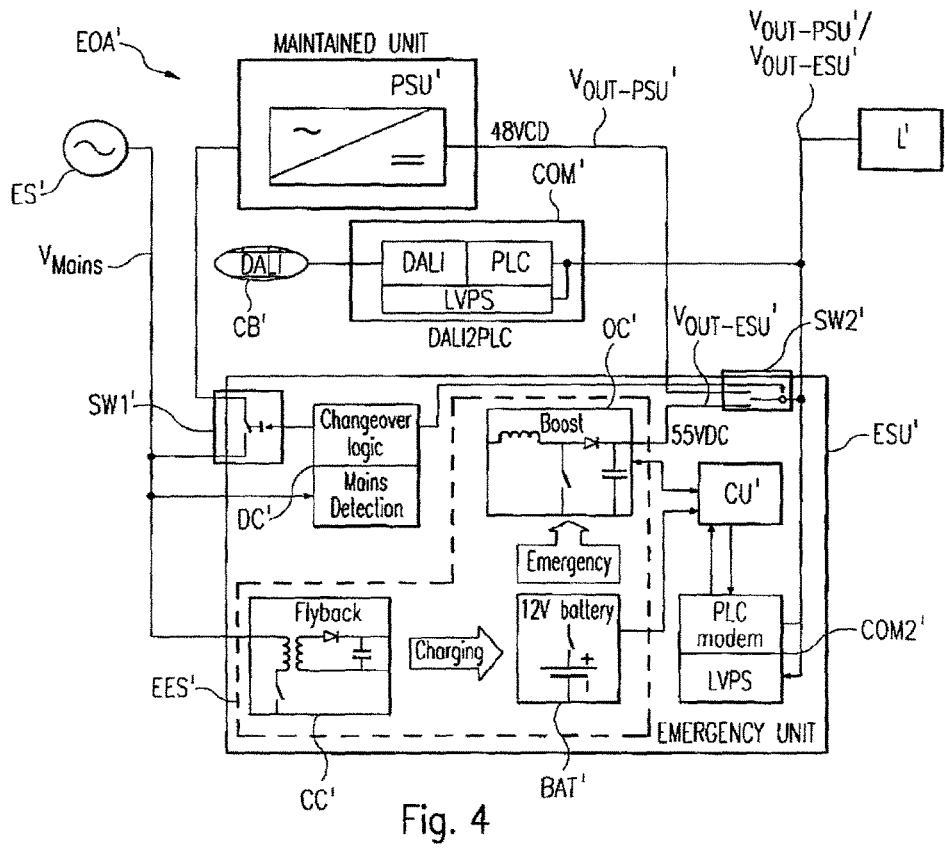
FIG. 4 schematically illustrates another arrangement according to the invention.

A more detailed and exemplary variant of the emergency operating arrangement EOA of FIG. 3 is shown in FIG. 4 as emergency operating arrangement EOA'. In FIG. 4 components corresponding to components of FIG. 3 are similarly named with an appended. In essence, the components of FIG. 4 are analog to the components of FIG. 3. However, for example it is illustrated that the detection circuit DC' can comprise a number of units, for example a mains detection circuit, which monitors a mains voltage $V_{MAINS}$ supplied form an electrical mains supply ES'. The mains detection circuit then issues a signal to a changeover logic, which, in case an emergency situation is detected, can operate the first switching element SW1 to cut off the power supply unit PSU from the electrical mains supply ES'. Also the charging circuit CC' is shown as a flyback converter, which can also be replaced by another suitable converter, while the output converter OC' is shown as a boost converter, boosting the voltage of a 12V battery to 55 Volts DC.

Also shown in an exemplary variant is the communication module COM, which is connected to a command source CB', in particular a DALI bus DALI and servers to convert DALI commands to PLC commands and preferably vice versa.

FIG. 4 also depicts that the power supply unit PSU', the emergency supply unit ESU' and the communication module COM can be separate and independently arranged modules and do not need to be applied close together, e.g. in a common enclosure.

Figure 5:
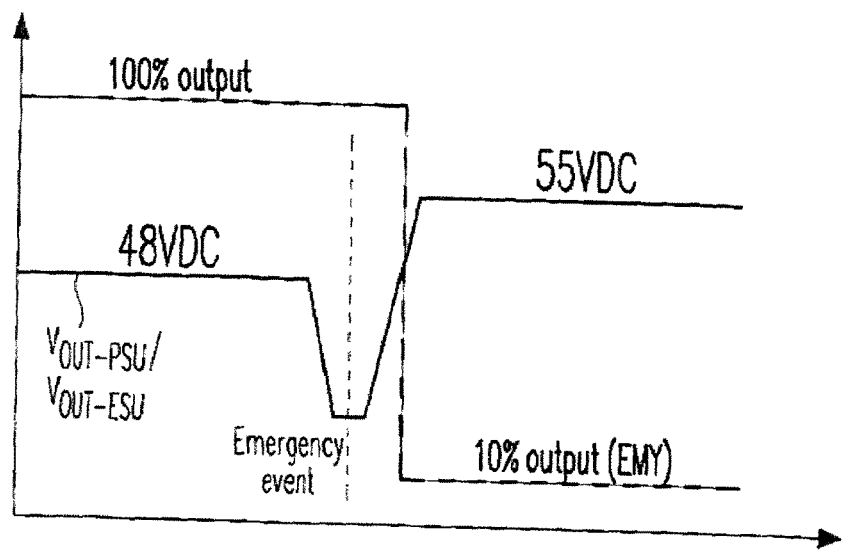
FIG. 5 shows a voltage diagram.

FIG. 5 shows the voltage $V_{OUT\text{-}PSU}/V_{OUT\text{-}ESU}$ output to the connected devices L. As shown, when the AC power supply fails or drops (thus indicating an emergency state), typically first a drop of the DC voltage supply level of the voltage $V_{OUT\text{-}PSU}$ is detectable by the connected devices, or on a bus connecting the connected devices to the power supply unit PSU. Then, after the emergency supply unit ESU takes over the increased or boosted emergency level of voltage $V_{OUT\text{-}ESU}$ will be assumed. The emergency converters or control circuits of the connected devices L will detect this change of the DC supply level and will then set their operational parameters to the emergency state, which can be for example the reduction of 100% dimming in the non-emergency mode to the illustrated 10% emergency mode dimming level (dashed line).

Figure 6:
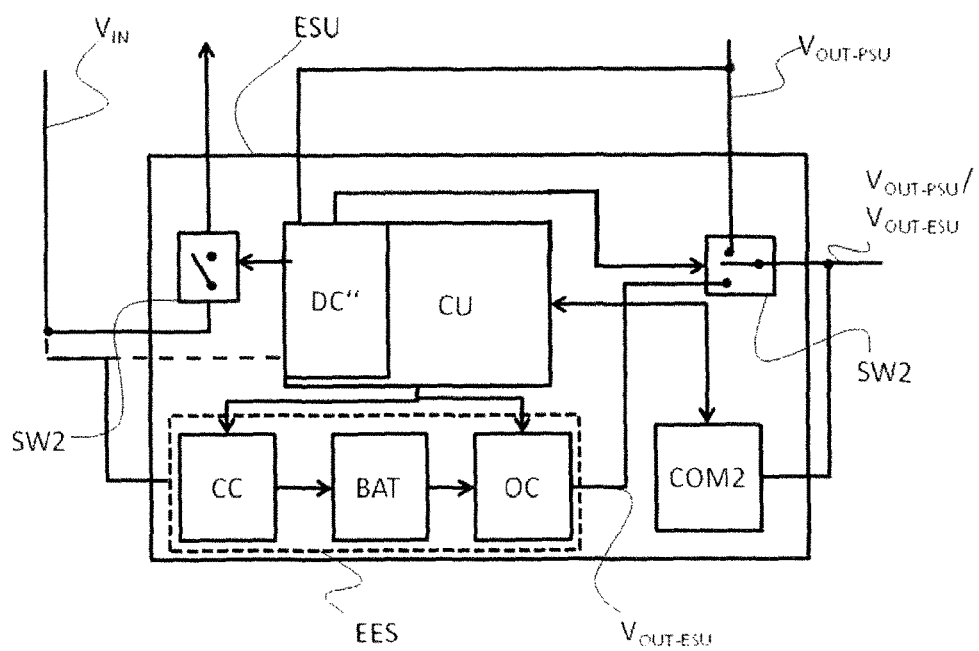
FIG. 6 schematically illustrates another emergency supply unit according to the invention.

As shown in FIG. 6, instead or in addition to the monitoring of the electrical supply, the detection circuit DC" can also monitor the voltage $V_{OUT\text{-}PSU}$ output by the power supply unit PSU. The components of FIG. 6 largely correspond to those of FIGS. 3 and 4. Therefore, if the detection circuit DC" detects that the voltage $V_{OUT\text{-}PSU}$ output by the power supply unit PSU fails or drops below a threshold value, the emergency supply unit ESU can take over to either supply the connected devices L with a voltage corresponding to the voltage typically output by the power supply unit PSU or with the voltage $V_{OUT\text{-}ESU}$ typically supplied by the emergency supply unit ESU (which might be higher or lower than the voltage $V_{OUT\text{-}PSU}$). A failure or drop of the voltage $V_{OUT\text{-}PSU}$ output by the power supply unit PSU can indicate a failure in the power supply unit PSU. The emergency supply unit ESU may then operate the second switching element SW2 to switch the supply of the connected devices L to the output voltage $V_{OUT\text{-}ESU}$ of the emergency energy source EES. In this case, the detection circuit DC" may operate solely on the detection of the voltage $V_{OUT\text{-}PSU}$ and my not need to sense the voltage $V_{IN}$ supplied from the electrical supply ES, ES', which is illustrated by the dashed line connecting the detection circuit DC" to the voltage $V_{IN}$.

However, the detection circuit DC" also monitors and senses the voltage $V_{IN}$ as described before. If the voltage $V_{IN}$ is still supplied, e.g. as an AC voltage, but on the other hand the voltage $V_{OUT\text{-}PSU}$ output by the power supply unit PSU fails or drops, the detection circuit DC" and/or the control unit CU may detect that the power supply unit PSU does not work correctly. The emergency supply unit ESU can then compensate the failure of the output DC voltage $V_{OUT\text{-}PSU}$ and can output a DC voltage $V_{OUT\text{-}ESU}$ on the same level (or a higher level) to the connected devices L. In this case, not an emergency situation is detected, but a failure of the power supply unit PSU. The control unit CU of the emergency supply unit ESU can then control the charging circuit CC and the output converter OC in a way to constantly or in intervals charge the energy storage component BAT and/or on the other hand can control the output converter OC to output the voltage $V_{OUT\text{-}ESU}$ on the level that is normally output by the power supply unit PSU. As an alternative the connected devices L may be powered with the voltage $V_{OUT\text{-}ESU}$ typically supplied by the emergency supply unit ESU (which is preferably higher than the voltage $V_{OUT\text{-}PSU}$) similar to an emergency situation. Also a lower voltage can be output by the emergency supply unit ESU. Therefore, the attached connected devices L may detect that a failure of the power supply unit PSU occurred and may e.g. output respective acoustical or optical signals, e.g. lighting means may operate at a specific dimming level distinguishable from the dimming level of the emergency operation and/or in a specific mode, e.g. blinking or with a ramping up and down dimming level.

Again, if a change in the voltage $V_{OUT\text{-}PSU}$ output by the power supply unit PSU is detected, the detection circuit DC" and/or the control unit CU can use the first and second switching element SW1, SW2 of the emergency supply unit ESU to separate the electrical supply ES, ES' from the power supply unit PSU and/or to switch the connected devices to the output of the output converter OC.

In particular, the detection circuit DC" can again output an indication signal, which indicates that an adverse change of the electrical supply voltage $V_{IN}$ and/or the voltage $V_{OUT\text{-}PSU}$ output by the power supply unit PSU occurred.

Therefore, in brief, the detection circuit not only monitors the input voltage $V_{IN}$ but also or only the voltage $V_{OUT\text{-}PSU}$ output by the power supply unit PSU. The connected devices L are hence supplied from the emergency supply unit ESU preferably with a voltage corresponding to the voltage $V_{OUT-PSU}$ normally supplied by the power supply unit PSU. This function can also be used to bypass the power supply unit PSU in case the power supply unit PSU fails or does not work inside the defined operating parameters and in particular is no longer powering the connected devices with the required output voltage $V_{OUT-PSU}$. The emergency supply unit ESU may also output a voltage $V_{OUT-ESU}$ which is preferably higher than the voltage $V_{OUT-PSU}$ so the connected devices L enter emergency mode (operation in emergency situation) but the emergency supply unit ESU is supplied via electrical supply ES, ES' and via the charger circuit CC so that the battery charge level is maintained.

Therefore, the emergency supply unit ESU can drive the connected devices also in a state in which for example an AC voltage is still present but there is a failure of the maintained unit. In such a case, according to the invention, even in a non-emergency case, the connected devices may be driven via the emergency supply unit ESU which is supplied via electrical supply ES, ES' or alternatively from the power provided by the energy storage component BAT and the output converter OC.

Of course, it is also possible to use the emergency supply unit ESU to compensate for a decrease or failure of the voltage $V_{IN}$ supplied from the electrical supply ES, ES'. Therefore, in case there is still voltage $V_{IN}$ supplied from the electrical supply ES, ES', the voltage $V_{IN}$ can be used to supply the connected devices L with a voltage on the same level of normally supplied voltage $V_{OUT-PSU}$ from the power supply unit PSU. An example for a failure in the voltage $V_{IN}$ supplied from the electrical supply ES, ES' is a change of one of the phases of an AC supply. Such a problem and in particular a drop out failure of one phase will typically lead to a failure of the DC voltage supplied to the connected devices.

Hence, if there is a failure in the supply voltage $V_{IN}$ from the electrical supply ES, ES', the emergency supply unit ESU can also output a voltage $V_{OUT-ESU}$ that corresponds to the voltage $V_{OUT-PSU}$ typically supplied by the power supply unit PSU to the connected devices L.

However, as previously stated, also a voltage higher than the voltage typically supplied by the power supply unit PSU can be supplied to the connected devices. In addition, as the emergency DC voltage level is set higher than the non-emergency level, the output converter OC can drive the same connected devices L in the same operating mode (step-down, step-up mode or kind of operation, e.g. continuous conduction mode, continuous conduction mode, discontinuous conduction mode . . . ) as in the emergency mode.

In the previous examples, there was only one channel shown between the emergency operating arrangement EOA and the connected devices L. The connected devices L were supplied from the same channel.

Figure 7:
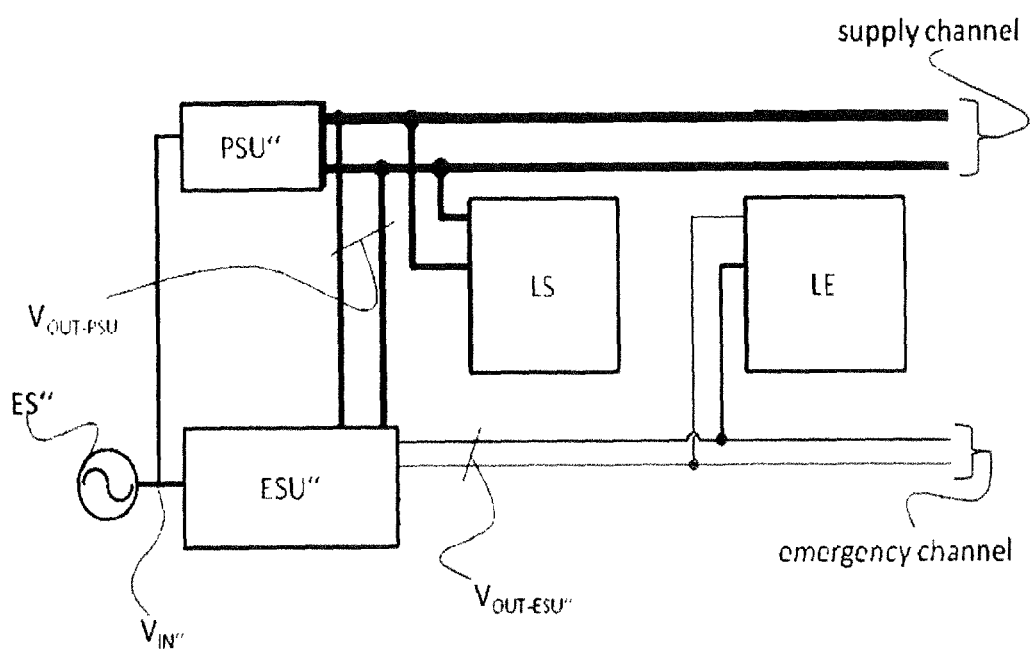
FIG. 7 schematically shows yet another arrangement according to the invention.

However, it is also possible, that the connected devices L include devices supplied from the power supply unit PSU through on supply channel and/or devices connected to the emergency supply unit ESU by an emergency channel. This is illustrated in FIG. 7, where the device LS is connected to the supply channel linked to an power supply unit PSU", and where device LE is connected to the emergency channel linked to a power supply unit ESU". The emergency supply unit ESU" and the power supply unit PSU" are supplied from an electrical supply ES" with voltage $V_{IN}$'''. The power supply unit PSU" outputs voltage $V_{OUT-PSU}$''', the emergency supply unit ESU" outputs voltage $V_{OUT-ESU}$'''.

Figure 8:
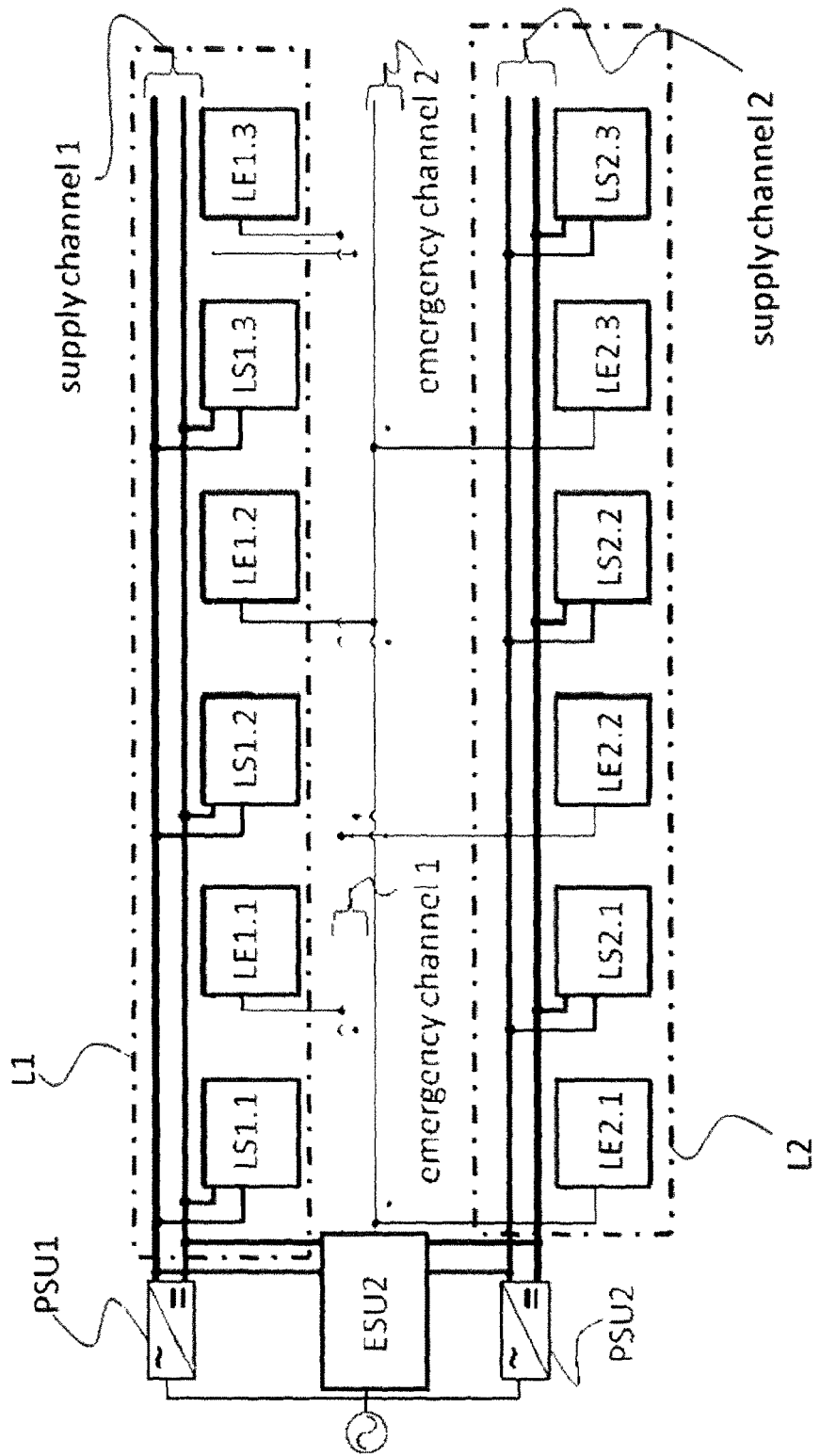
FIG. 8 schematically illustrates still another arrangement according to the invention.

Of course, it is also possible that there is more than one supply channel and/or more than one emergency channel provided by which connected devices L can be supplied. This is shown in FIG. 8. The connected devices L supplied by the emergency supply unit ESU can be distinct from the devices connected to the power supply unit PSU, as already indicated in FIG. 7. The provision of separate channels or more than one channel per type may also be due to safety requirements, which may vary from country to country.

When there are two channels, there can be more than one power supply units PSU, e.g. two power supply units PSU1 and PSU2 which supply connected devices. For example, as shown in FIG. 8, a group of connected devices LS1.1-LS1.3 and LE1.1-LE1.3 are shown as group L1, where connected devices LS1.1-LS1.3 are supplied by power supply unit PSU1 via supply channel 1, while every other connected device LE1.1-LE1.3 is supplied from the emergency supply unit ESU2 via an emergency channel. In particular, connected devices LE1.1 and LE1.3 are supplied from an emergency channel 1, while connected device LE1.2 is supplied from an emergency channel 2.

Similarly, in a group L2, connected devices LS2.1-LS2.3 are supplied by power supply unit PSU2 via supply channel 2, while every other connected device LE2.1-LE2.3 is supplied from the emergency supply unit ESU2 via an emergency channel. In particular, connected devices LE2.1 and LE2.3 are supplied from an emergency channel 2, while connected devices LE2.2 is supplied from an emergency channel 1.

In FIG. 8, the emergency supply unit ESU2 hence provides emergency channels 1, 2 and even if output of both the power supply units PSU1, PSU2 stops and also one of the emergency channels fail, in each of the group L1, L2 there is still one connected device supplied from the other emergency channel.

In particular, as the connected devices LE1.1-LE1.3, LS1.1-LS1.3, LE2.1-LE2.3, and LS2.1-LS2.3 can be lighting means and the groups L1, L2 can symbolize luminaries in which the connected devices are arranged. Hence, there is always at least one lighting means that can be driven in each luminary, even if both supply channels and one emergency channel fails. Of course, the invention is not limited to two supply and/or emergency channels, but more channels can be provided. Moreover, groups L1, L2 may also be arranged in one luminary. Such arrangement would form a solution which is fitting to the requirement to have each alternate emergency point supplied from a different supply channel.

Figure 9:
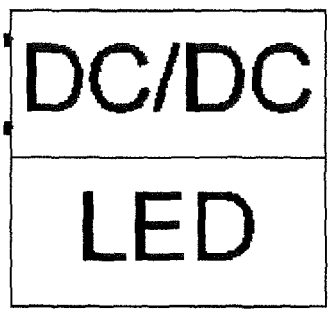
FIG. 9 shows exemplarily and schematically illustrates a connected device according to the invention.

An exemplary lighting means that can be used as a connected device L is shown in FIG. 9, where a DC/DC converter drives an LED. The DC/DC converter can especially be an emergency converter. The DC/DC converter may be formed by a flyback converter, buck converter, buck-boost converter, boost converter or another switch mode power supply topology. The DC/DC converter and the LED may be arranged inside a common housing and may be placed on the same printed circuit board or on separate circuit boards electronically linked to each other. The connected device L may comprise a communication unit in order to receive and/or transmit communication signals to the power supply unit PSU and/or the emergency supply unit ESU. Therefore, the connected device L may detect via the communication unit the voltage $V_{OUT-PSU}$ which is supplied by the power supply unit PSU and which may be modulated with a communication signal in order to provide a communication between the supply arrangement SA and/or the command source CB and the connected devices L, e.g. by power line communication (PLC).

Figure 10:
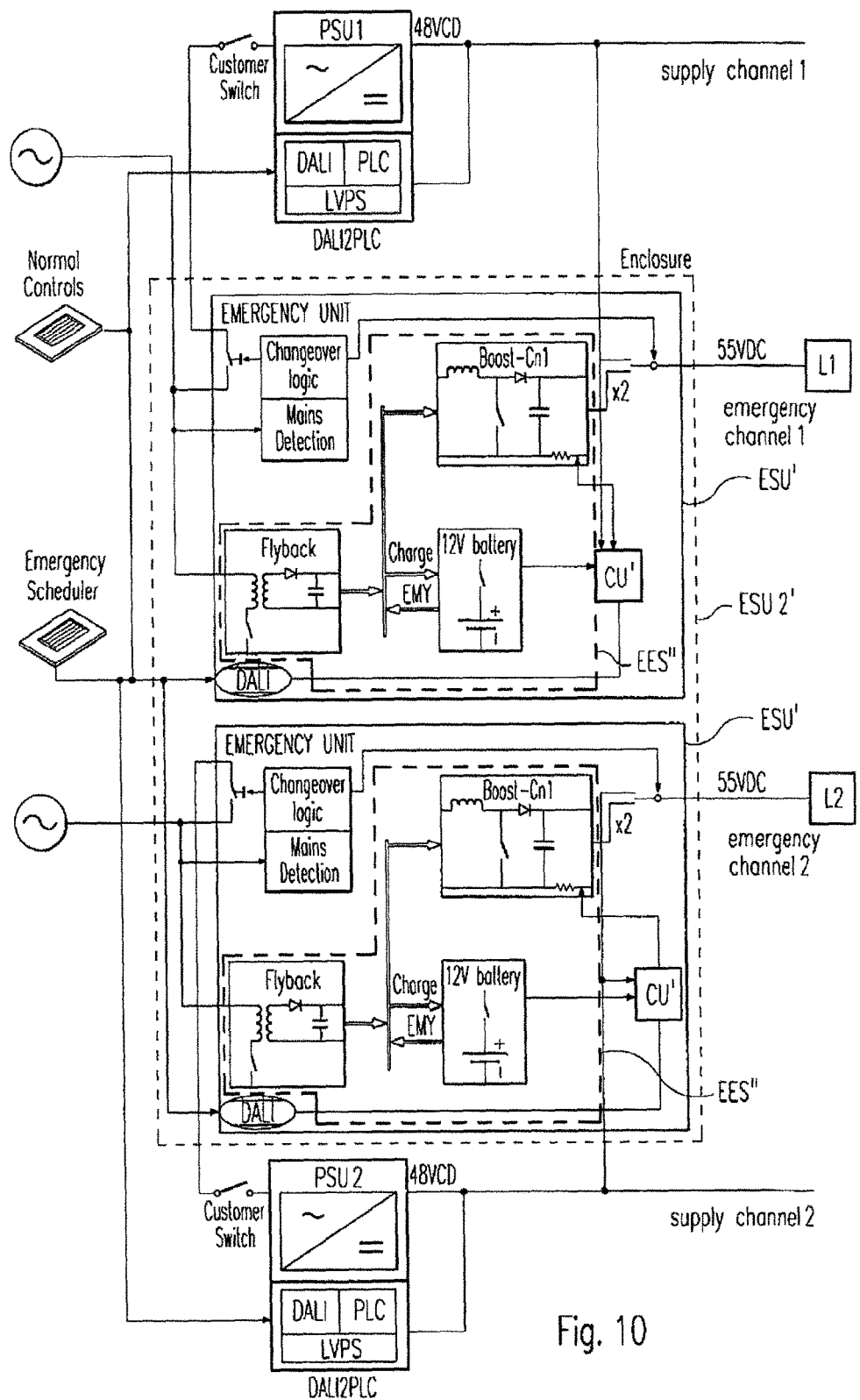
FIG. 10 schematically illustrates still another arrangement according to the invention.

An exemplary realization of the emergency supply unit ESU2 of FIG. 8 is shown in FIG. 10 as emergency supply unit ESU2', wherein in principle the emergency supply unit EMU2' is a combination of two emergency supply units ESU' shown in FIG. 4. In addition, customer switches are shown which can be used to disconnect the energy supply from a power supply unit PSU1 and/or the second power supply unit PSU2. The combination can also be placed in a single enclosure. Also control components such as an emergency scheduler, but also controls to control the normal operation of power supply units PSU1, PSU2 and the parts of the combined emergency supply unit ESU2' are shown, e.g. for setting parameters, control operation such as dimming, color tuning activation, deactivation, . . . . The emergency scheduler can be used to set the parameters and procedures that should be employed and run in case of an emergency. Of course, each of the parts ESU' of the emergency supply unit ESU2 can also be of different design. Also shown are the emergency energy sources EES", which also show a voltage EMY supplied by the energy storage components to the output converters in case of emergency. The communication modules COM2 are not shown. Only the communication interface DALI is shown for each of the parts ESU'.

It should be understood that the power supply unit can also be separate from the emergency supply unit. In particular, power supply units and emergency supply units can be different modules. Therefore, the emergency supply unit can also be integrated in a connected device L as long as it is possible for the emergency supply unit to detect the voltage required from the electrical supply and/or the voltage output by the one or more power supply units. In addition, there is a further channel supplying the emergency converters and lighting means. According to the invention, the DC power from the central PSUs can be tapped off and fed to this emergency channel.

In case there are no physically distinct channels for supplying the connected devices in an emergency or a non-emergency case, only a sub-group of the connected devices L may be configured to be emergency converters. The emergency converters may assume an emergency operating mode or failure operation mode (e.g. due to a detected failure in the power supply, the DC voltage, and/or the voltage $V_{IN}$) when they detect a change of the DC supply voltage level, while other converters may be configured to switch off when detecting such supply voltage change. As shown in FIG. 5, when the supply voltage supplied from the energy supply, and then in particular the AC supply voltage, fails (which causes the detection of an emergency state), there is typically a first drop of the DC supply level of the DC voltage supplied to the connected device before the boosted emergency level will be assumed, i.e. the emergency supply unit ESU, ESU2 increases the voltage of the DC voltage supplied to the connected devices. The emergency converter will detect this change in the DC supply voltage and will then that there are operational parameters to an emergency state parameter set, which can for example be the reduction of a light emission of 100% to, for example, 10%. The increase in the in the output DC voltage can also be used to signal the other voltage changes detected by the detection circuit. Also, when there are more voltage levels that can be output by the emergency supply unit, different converters can be used in the connected devices. For example, lighting means with converters detecting different voltage levels can be used. Therefore, the activation/deactivation of specific lighting means allows detection of a specific problem with the power supply.

It should be understood, that the emergency supply unit can sense the voltage output by the power supply unit(s) anywhere in a DC grid supplied therefrom.

The invention claimed is:

1. Emergency operating arrangement (EOA) for at least one building technical device (L), comprising:
a power supply unit (PSU) that is configured to output DC power at a first fixed voltage level;
an emergency supply unit (ESU) that is configured to output DC power at a second fixed voltage level that is higher than the first fixed voltage level; and
a switch that is able to receive DC power from the power supply unit and from the emergency supply unit and that can be controlled to output one of DC power from the power supply unit at the first fixed voltage level or DC power from the emergency supply unit at the second fixed voltage level;
the power supply unit (PSU) and the emergency supply unit (ESU) being adapted to be supplied by an electrical supply (ES), wherein the emergency supply unit (ESU) is configured to detect an emergency situation and control the switch to output the DC power from the emergency supply unit at the second fixed voltage level when the emergency situation is detected, thereby signaling to the building technical device (L) that the emergency situation has been detected.

2. Emergency operating arrangement (EOA) according to claim 1, wherein the emergency supply unit (ESU) comprises a detection circuit (DC) configured to detect a change in the electrical supply (ES) as indication of the emergency situation, the emergency supply unit (ESU) outputting DC power from the emergency supply unit at the second fixed voltage level when the change in the electrical supply (ES) indicating an emergency situation is detected by the detection circuit (DC).

3. Emergency operating arrangement (EOA) according to claim 1, wherein the emergency supply unit (ESU) comprises a charging circuit (CC), and an energy storage component (BAT), the charging circuit (CC) being configured to charge the energy storage component (BAT).

4. Emergency operating arrangement (EOA) according to claim 3, wherein the charging circuit (CC) is supplied from the electrical supply (ES).

5. Emergency operating arrangement (EOA) according to claim 1, wherein the emergency supply unit (ESU) comprises an output converter (OC), supplied from the energy storage component (BAT), the output converter (OC) being configured to output DC power at the second voltage level.

6. Emergency operating arrangement (EOA) according to claim 1, wherein the detection circuit (DC) is configured to output an indication signal indicating a state of the electrical supply (ES), in particular indicating whether the electrical supply (ES) is an AC voltage, a DC voltage, or no voltage.

7. Emergency operating arrangement (EOA) according to claim 6, wherein the emergency supply unit (ESU) comprises a control unit (CU) configured to evaluate the indication signal output by the detection circuit (DC) and being configured to control operation of at least one of the charging circuit (CC), the output converter (OC) and the switch.

8. Emergency operating arrangement (EOA) according to claim 7, wherein the switch is a transistor or relay and is configured to switch between the output of the output converter (OC) and the output of the power supply unit (PSU).

9. Emergency operating arrangement (EOA) according to claim 7, comprising a communication module (COM2) configured to receive configuration information, wherein the control unit (CU) is configured to evaluate the configuration information and to adapt operating parameters of the emergency operating arrangement (EOA) and in particular of the emergency supply unit (ESU).

10. Emergency operating arrangement (EOA) according to claim 2, wherein the detection circuit (DC) is configured to detect a failure of an AC voltage or a change from an AC voltage to a DC voltage or a switch on of a DC voltage.

11. Emergency operating arrangement (EOA) according to claim 3 wherein the charging circuit (CC) is a flyback converter.

12. Emergency operating arrangement (EOA) according to claim 5 wherein the output converter (OC) is a boost converter.

13. Building technical device (L), comprising:
   an LED lighting module;
   at least one input terminal, and
   a DC/DC converter configured to output DC power to the LED lighting module at an appropriate voltage level for the LED lighting module, wherein the DC/DC converter is also an emergency converter that detects DC voltage supplied at the at least one input terminal, and operates the building technical device (L) in an emergency operating mode, in particular to dim the LED lighting module, when the detected DC voltage increases above a threshold value.

14. A system of at least one building technical device (L) according to claim 13 and an emergency operating arrangement (EOA) comprising:
   a power supply unit (PSU) that is configured to output DC power at a first fixed voltage level; and
   an emergency supply unit (ESU) that is configured to output DC power at a second fixed voltage that is higher than the first voltage level, and higher than said threshold value;
   the power supply unit (PSU) and the emergency supply unit (ESU) being adapted to be supplied by an electrical supply (ES), wherein the emergency supply unit (ESU) is configured to detect an emergency situation and the emergency operating arrangement (EOA) is configured to output DC power from the power supply unit at the first fixed voltage when an emergency situation is not detected and to output DC power from the emergency supply unit at the second fixed voltage level when the emergency situation is detected,
   wherein the at least one input terminal of the at least one building technical device (L) is connected to the emergency operating arrangement (EOA).

15. The system of claim 14, wherein the at least one terminal of the at least one building technical device (L) is connected to emergency operating arrangement (EOA) by separate supply channels.

16. Method for operating at least one building technical device (L), the method comprising the steps of:
   supplying power from an electrical supply (ES) to a power supply unit (PSU) and to an emergency supply unit (ESU);
   configuring the power supply unit (PSU) to output DC power at a first fixed voltage level;
   configuring the emergency supply unit (ESU) to output DC power at a second fixed voltage level that is higher than the first voltage level and higher than a threshold level;
   using the emergency supply unit (ESU) to detect whether an emergency situation exists;
   supplying DC power from the power supply unit to the building technical device (L) at the first fixed voltage level when no emergency situation is detected;
   supplying DC power from the emergency supply unit to the building technical device (L) at the second fixed voltage level when an emergency situation is detected;
   using the building technical device to detect whether the voltage level of the DC power supplied to the building technical device is above the threshold level, and if so operating the building technical device in an emergency mode.

* * * * *